INVENTORS
George C. Luebkeman
John R. Miles
BY

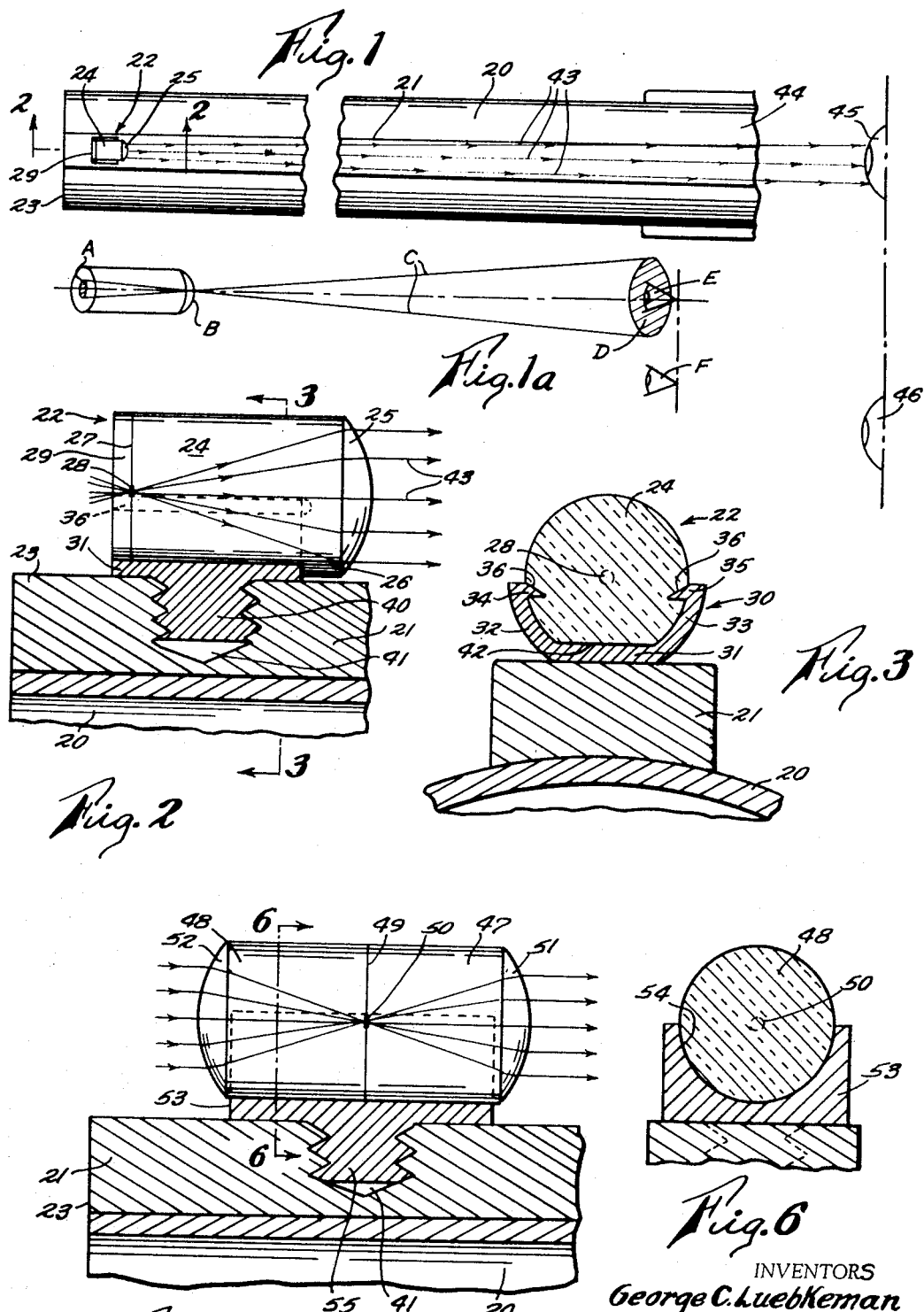

ATTY.

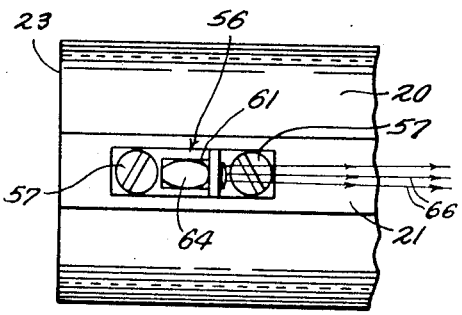
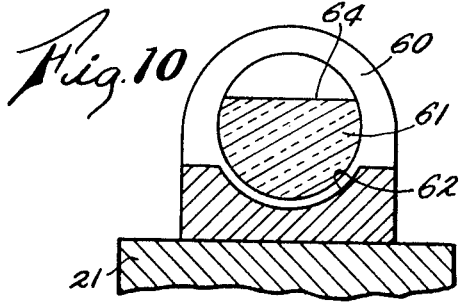
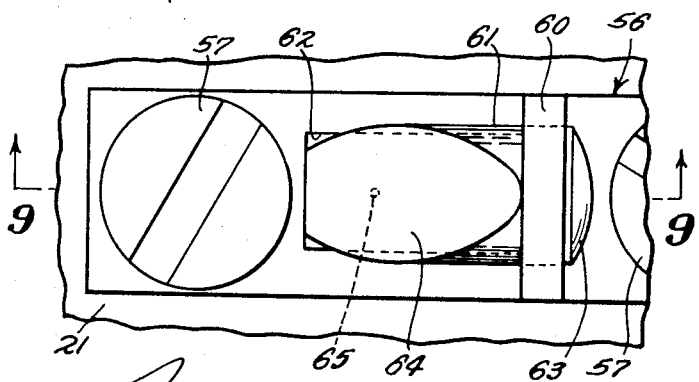
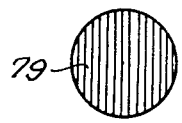
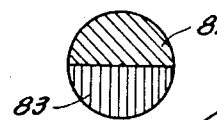
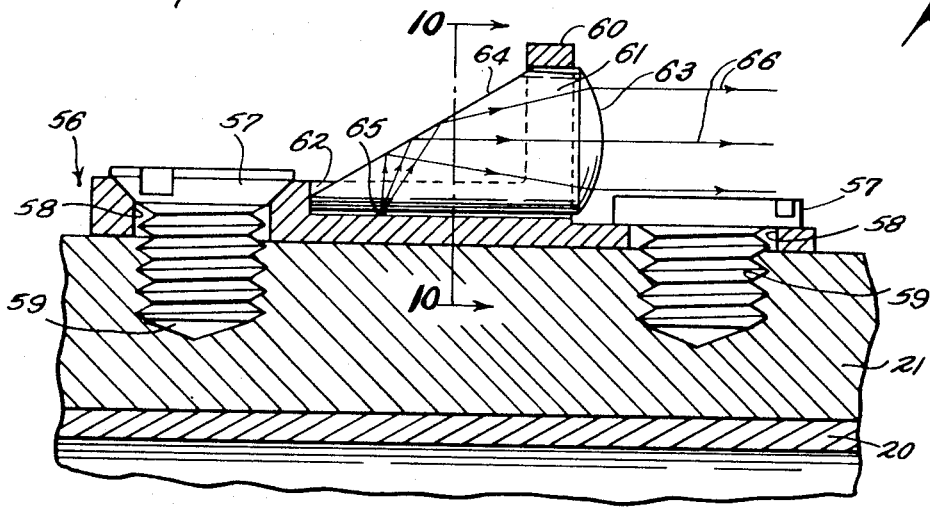

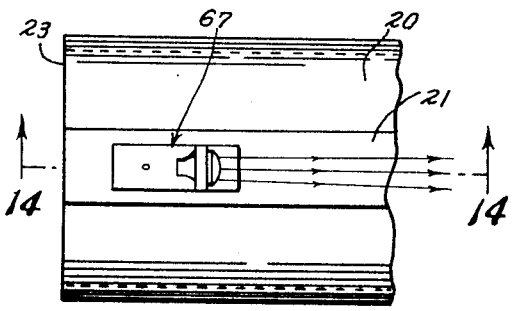
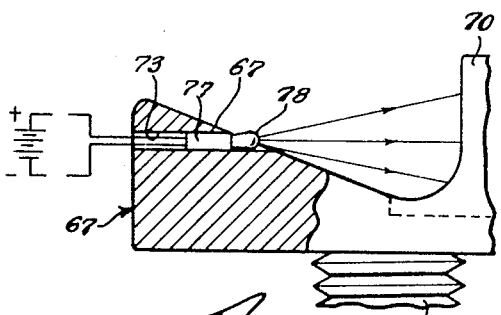
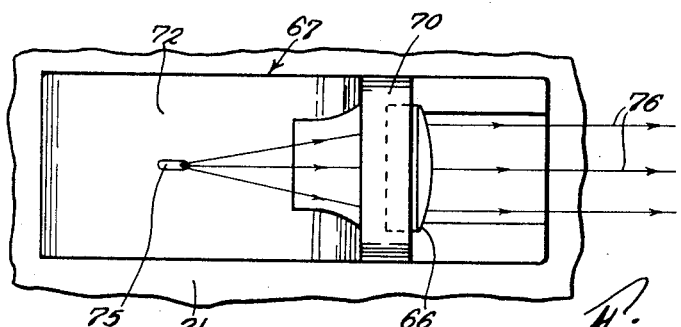
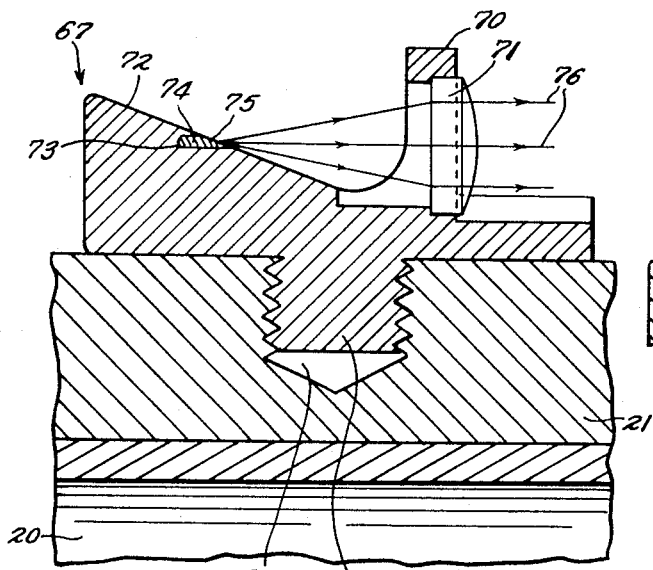
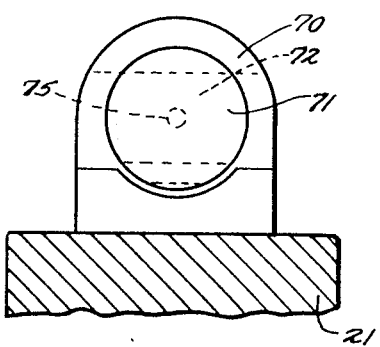

United States Patent Office 3,362,074
Patented Jan. 9, 1968

3,362,074
BINOCULAR FRONT SIGHT FOR FIREARMS
George C. Luebkeman, 214 Cherokee Ave., Cincinnati, Ohio 45233, and John R. Miles, Glenview, Ill.; said Miles assignor to said Luebkeman
Filed Jan. 22, 1964, Ser. No. 339,530
11 Claims. (Cl. 33—52)

ABSTRACT OF THE DISCLOSURE

A binocular front bead sight for guns, having a minute color spot illuminated by ambient light rays which are then collimated by a lens directing them in a laterally restricted area toward the breech end of the barrel. Sensing of an intensified image by the aiming eye indicates the correct line of sight, while the non-aiming eye is unattracted to the sight.

This invention relates to an improved gun sight and is particularly directed to a front sight device to be used on shot guns by huntsmen, trap shooters, and the like, that wish to employ binocular vision in aiming said guns at moving targets.

It is the primary object of this invention to provide a binocular front sight for shot guns that will appear as an attractive and distinct image visible at the location of the aiming eye of the shooter and at the same time will be relatively unattractive from the position of the shooter's non-aiming eye: thereby to improve the effective binocular aiming ability of the shooter endeavoring to hit a moving target.

Another object of this invention is to provide at the bead sight position of a gun a distinctively colored, bright image visible to the aiming eye but non-visible by the non-aiming eye of a shooter in the act of aiming the gun at a moving target with binocular vision.

A further object of the invention is to provide a relatively small, compact and trouble free binocular front sight device for a shot gun that is protectively mounted against damage and can be simply maintained in efficient operating condition.

A still further object of this invention is to provide an attractive binocular front sight device that will effectively aid a shooter, in the act of aiming the gun at a moving target, to bring the aiming eye into an accurate position with respect to the sight device by sensing the apparent intensity of the sight image when a single colored sight is used or by observing the kind of color eminating therefrom when a multi-colored sight device is employed.

Still other objects of the invention will become apparent from the following specification taken in conjunction with the accompanying drawings depicting preferred embodiments of our invention, and wherein:

FIG. 1 is a fragmental, top plan view of the barrel of a single barrel shot gun mounting one form of our binocular front sight device, said view illustrating the relative positions of a shooter's eyes and the sight device when in the act of aiming said gun.

FIG. 1a is a schematic view in perspective illustrating the principles of operation of our improved gun sight.

FIG. 2 is a greatly enlarged section taken on line 2—2 of FIG. 1.

FIG. 3 is a section on line 3—3 of FIG. 2.

FIG. 5 is a greatly enlarged section showing another modification of our sight device.

FIG. 6 is a section taken on line 6—6 of FIG. 5.

FIG. 7 is a fragmental, top plan view of the muzzle end of a shot gun barrel showing still another modification of our binocular front sight device.

FIG. 8 is a greatly enlarged top plan view of the modified front sight device shown in FIG. 7.

FIG. 9 is a section taken on line 9—9 of FIG. 8.

FIG. 10 is a section taken on line 10—10 of FIG. 9.

FIG. 12 is a fragmental, top plan view of the muzzle end of a shot gun showing a further modification of our binocular front sight device.

FIG. 13 is a greatly enlarged top plan view of the modified front sight shown in FIG. 12.

FIG. 14 is a greatly enlarged section taken on line 14—14 of FIG. 12.

FIG. 15 is a rear elevational view of the front sight shown in FIG. 13.

FIG. 16 is a fragmental view, partly in central section, of a still further modification of our front gun sight; said view being similar to the device shown in FIG. 13.

FIGS. 17, 18 and 19 are plan views showing the different color patterns for the minute spots employed in the several modifications of our binocular sight device.

Figure 4:
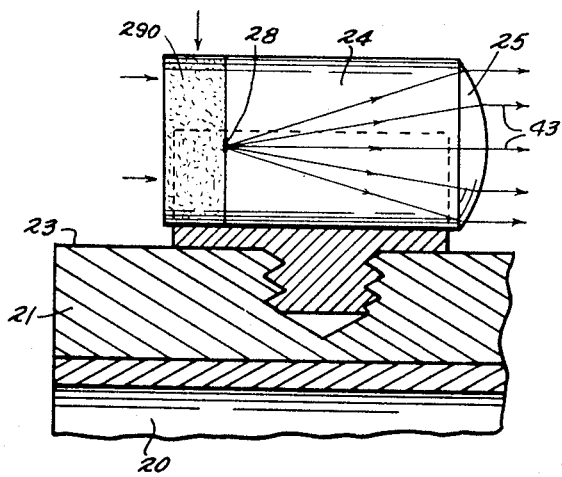
FIG. 4 is a view like FIG. 2, showing a modified form of our binocular front sight device.

Our invention is illustrated in FIG. 1a of the drawing and relates generally to binocular front sight devices each capable of providing an intense and minute colored light source A at the front end of a gun barrel, said devices having a focusing and magnifying means B for directing the light source into substantially parallel rays C directed rearwardly toward the breech end of the gun barrel to and through a predetermined sighting position D to be taken by the aiming eye E of the shooter; said light source being attractive to the aiming eye E of the shooter and unattractive to the non-aiming eye F. At the outset it is to be noted that the spot of color at the light source A is preferably only .007" in diameter and that the size of the lateral area of the sighting position D may be regulated by varying the diameter of the color spot at said light source A.

Now with reference to FIGS. 1–4 of the drawings, the numeral 20 indicates the barrel of a conventional single barrel shot gun which may have the usual rib 21 positioned longitudinally upon the top portion of the barrel; one form 22 of our binocular sight device being located on the front or muzzle end 23 of the barrel rib, at the place occupied by the usual bead sight. Although our invention is illustrated in the drawings as mounted on a single barrel shot gun it will be apparent that the sight is applicable to double barreled shot guns by those skilled in the art.

The sight device 22 comprises a generally cylindrical, transparent member 24 composed of a solid body of clear plastic, clear optical glass, or the like. The exterior surface of the member may be frosted, etched or polished depending upon the amount and nature of the circumambient light that is required to be transmitted into the body of the transparent member 24. A convex lens 25 is located on the rear of breech end of the transparent member 24, said lens being formed integral with said member or separately formed and affixed to the rear end of the transparent member 24 by a suitable cement along confronting, planar faces 26 of the transparent member and lens. The forward or muzzle end of the transparent member 24 preferably terminates in a laterally disposed, plane surface 27, the center of the surface having a minute spot 28 of a suitable color disposed thereon. A cover plate 29 of clear plastic or clear optical glass is cemented or otherwise affixed to the transparent member 24 in surface contact with the plane surface 27 thereon.

The sight device 22 is mounted on the muzzle end 23 of the gun barrel 20 by a suitable holder 30 that is substantially U-shaped in the lateral section (FIG. 3), said holder having a base 31 and two upstanding sides 32 and 33 integral therewith which are provided at their upper ends with confronting, inturned flanges 34 and 35, respectively. The flanges engage in opposed grooves 36—36 formed in the cylindrical side of the member 24 and the cover plate 29. The base of the holder has an externally threaded lug 40 projecting downwardly therefrom which is threaded in a tapped bore 41 formed in the muzzle end portion of the rib 21. With reference to FIG. 3 it will be seen that a flat 42 is formed on the underside of the cylindrical transparent member 24 to provide an offset in the member to compensate for the base 31 of the holder and thereby bring the full lens 25 closely adjacent the upper surface of the rib. (FIG. 2).

It is particularly to be noted that the minute spot of color 28 is located in the principal focus or focal point of the convex lens 25 and that the principal axis of the lens coincides with the center line of the transparent member 24 and also lies in the vertical plane that contains the longitudinal center line of the gun barrel. Further, the curvature of the polished surface of the lens 25 is so formed as to refract the rays of colored light from the spot 28 into rays 43 that are substantially parallel to the principal axis as they are projected rearwardly toward the breach end 44 of the gun barrel. Thus light rays from the minute spot of color 28 will be refracted by the lens and the colored rays will be directed rearwardly from the sight device 22 in a laterally restricted area toward a sighting position to be occupied by the aiming eye of the gun user. A shooter using binocular vision in the aiming of a gun having our gun sight will, in the action of aiming, place his aiming eye, indicated in FIG. 1 by the reference numeral 45, in proximity to the normal barrel sighting position and as said aiming eye assumes the position indicated in FIG. 1, its line of sight will coincide with the laterally restricted area of colored, substantially parallel light rays 43 emitted from the lens 25; such position being sensed by the hunter because of the relatively high intensity of the rays seen by the eye 45 when it comes within the restricted sighting area. When this position is attained the gun barrel can be aimed at the moving target with precision because the non-aiming eye 46 of the hunter, though open and useful in aiding the aiming eye to see the moving target, will not be attracted to the sight because it will not see the colored light image but merely a non-attractive sight form that will not distract the hunter in the act of aiming the gun with eye 45.

As shown in FIG. 4 the cover plate for the transparent member 24 instead of being a clear plastic or clear optical glass 29 may be a cover plate 290 made of a milk glass or other cloudy glass having light collecting and light refracting particles imbedded therein which will highlight the spot 28 and create, in some instances, more intense rays 43 than those produced by the binocular sight device shown in FIGS. 1–3 of the drawings.

With reference to FIGS. 5 and 6 of the drawings there is shown a modification of our binocular gun sight which comprises two cylindrical, transparent members 47 and 48 disposed in axial alignment and having their confronting faces secured together at 49 by a suitable cement. A minute colored spot 50 is located between the affixed faces of the two cylindrical members and is located in the common axis of said members. A convex lens 51 is affixed to the breech or rear end of the member 47 whilst a convex lens 52 is affixed to the muzzle or front end of the member 48, each by means of suitable cement, or the like. The sighting device shown in FIGS. 5 and 6 may be mounted on the muzzle end 23 of the gun barrel 20 by a holder 53 that has a semi-cylindrical trough 54 formed in its upper side and an externally threaded lug 55 projecting downwardly therefrom which is threaded in the threaded bore 41 formed in the gun barrel rib 21. The outer surface of the trough may be nickel plated so as to reflect a relatively great amount of light into the transparent members 47 and 48 that are affixed in the trough 54 of the holder by suitable cement.

Light rays entering the bodies of the members 47 and 48 from the circumambient area of the gun and through the lens 52 are colored by the minute spot 50 and are refracted twice to leave the sight body at the rear end through the lens 51 as substantially parallel rays of colored light directed toward the sighting position at the breech end of the gun.

With reference to FIGS. 7–9 of the drawings which show another modification of our binocular front sight for shot guns the numeral 56 indicates a sight body mounted upon the muzzle end 23 of the shot gun barrel 20 by screws 57—57 passed through holes 58—58 formed through the ends of the body and co-operating with tapped bores 59—59 formed in the barrel rib 21. The sight body includes integrally along its central portion an upstanding ring 60 which mounts a transparent member 61 that is composed of a solid, generally cylindrical body of plastic, optical glass, or the like. The portion of the sight body 56 forwardly of the ring is machined to provide a semi-cylindrical depression 62 to receive the underside of the member 61, said depression and ring being in longitudinal alignment and having coinciding longitudinal center lines lying in the vertical plane that contains the longitudinal axis of the gun barrel. The rear end 63 of the mounted transparent member 61 has a convex lens configuration whilst a polished flat portion 64 is formed on the forward top portion of the said member and is disposed in a plane normal to the vertical plane containing the axis of the barrel axis and inclined upwardly and rearwardly of the member. A minute spot of color 65 is provided between the member and the body and is located in the principal focus of the lens 63 and is also positioned so that it will be illuminated by light gathered from above and around the sight by the member. The spot 65 will then cast its image on the flat portion 64 and be mirrored thereby onto the convex lens 63. Thus the colored image of the spot 65 will be refracted by the lens and will be projected thereby rearwardly toward the breech of the gun as substantially parallel colored rays 66 that are laterally restricted so that only the aiming eye of a shooter, properly located in gun aiming position, will be attracted to the front sight; whilst the non-aiming eye will not be attracted to said sight.

Figure 11:
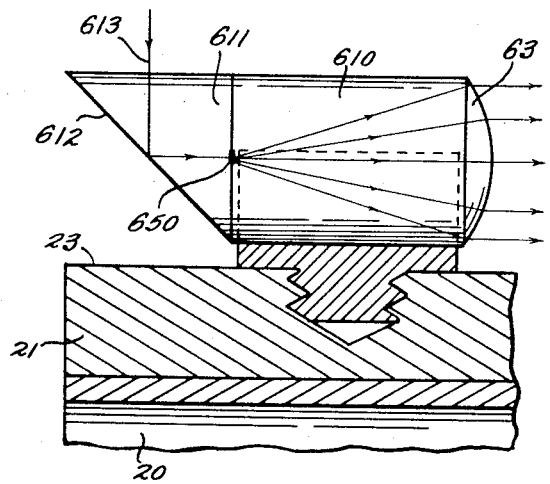
FIGS. 11 and 11a are greatly enlarged sections showing two other modifications of our binocular sight device.
Figure 11A:
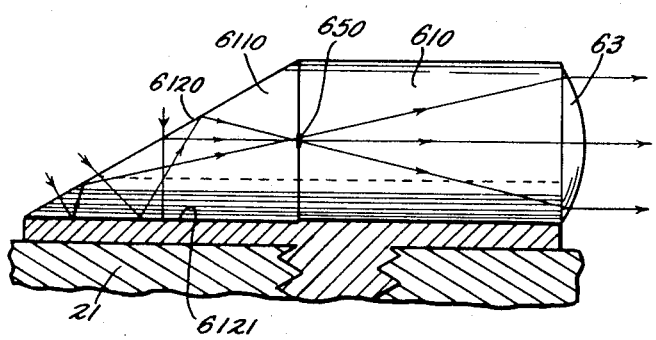

Referring to FIGS. 11 and 11a of the drawings it will be seen that the transparent member 61 of the device shown in FIGS. 7–10, inclusive, could be extended longitudinally to provide a transparent member 610 having the lens 63 affixed to its rear face and a reflecting member 611, made of clear plastic or optical glass affixed on its forward face. The reflecting member is disposed in a plane normal to the vertical plane containing the axis of the gun barrel and is inclined downwardly and rearwardly from the muzzle thereof. The member 611 is provided with a polished or a silvered flat surface 612, and the minute spot of color 650 is disposed between the confronting faces of the member 610 and 611 in the focal point of the lens 63. Rays of light 613 are therefore gathered from above and reflected by the flat surface 612 toward the breech end of the gun thus intensifying such rays under certain aiming conditions. In FIG. 11a the light reflecting member 611 of the device depicted in FIG. 11 takes the form of a clear plastic or optical glass reflecting member 6110 affixed to the front face of the member 610, said reflecting member having a flat, polished face 6120 lying in a plane normal to the plane containing the axis of the gun barrel and inclined upwardly and rearwardly from the muzzle end of said barrel. The underside 6121 of the reflecting member is silvered to provide optimum light reflecting properties so that light rays from above the sight may strike the silvered surface 6121 and be reflected thereby onto the flat, polished surface 6120 and thence reflected rearwardly through and around the minute colored spot 650 to be refracted by the lens 63 into substantially parallel rays of colored light to the eye aiming position of the shooter utilizing the gun.

Now with reference to FIGS. 12–15, inclusive, of the drawings there is shown a further modification of our binocular front sight comprising a sight body 67 mounted on the muzzle end 23 of the shot gun barrel 20 by means of an externally threaded lug 68 (FIG. 14) which cooperates with a tapped bore 69 formed in the barrel rib 21. The body 67 has an upstanding ring 70 disposed intermediate its front and rear ends which mounts a single convex lens 71. The forward part of the body is formed with an upwardly and forwardly inclined wall portion 72 which is provided with a longitudinal bore 73 that has its mouth portion lying in the focal center of the lens 71. The bore is filled and holds a colored substance 74 that may also be fluorescent to increase its brightness. Thus the exposed face 75 of the bright colored substance 74 will receive light from above the barrel and will cast colored light rays on the lens 71, said lens refracting the rays to project them rearwardly toward the breech end of the gun barrel as substantially parallel rays 76 that will be attractive to the aiming eye of the shooter when properly in sighting position, whilst said rays and sight will be non-attractive to the non-aiming eye of the shooter.

FIG. 16 illustrates a slight modification of the form of our invention shown in FIGS. 12–15 of the drawings wherein the bore 73 is extended through the body 67 of the front sight and a minature light bulb 77 is mounted therein with the glowing portion 78 thereof in the focal point of the lens 71. The battery, its lead wires and "off-on" switch for the bulb may be disposed on the underside of the barrel or in the gun stock, as desired; said parts being merely shown diagrammatically in FIG. 13, as one skilled in the art may readily install said parts on a shot gun without the exercise of the inventive faculty.

Hereinbefore we have indicated the minute colored spot throughout the several figures of drawings by reference character A in FIG. 1a and by reference numerals 28, 65, 65a, 75 and 78 and have stated that said spot should preferably be either opaque or translucent and be colored red as indicated by the colored spot 79 in FIG. 17 of the drawings. It is also contemplated that the spot may have a central area 80 (FIG. 18) of one color, such as red, and a peripheral area 81 surrounding the central area 80 and of a contrasting color such as green. When our binocular aiming devices have said multi-colored spot incorporated therein, light rays from this minute spot will be directed rearwardly toward the sighting position which in lateral section will have a somewhat enlarged pattern of the particular spot. When the hunter's aiming eye sees only the red central rays of the pattern he will know his eye is in exact aiming position whilst seeing a green or peripheral color will indicate that his aiming eye is not quite in exact aiming position.

With respect to FIG. 19 of the drawing a minute spot is shown that has an upper portion 82 of one color such as the color green while the bottom portion 83 is of a contrasting color, such as the color red. In this case as long as the hunter's aiming eye sees the red color his aiming eye is in exact position to aim the gun while seeing a green color will indicate that the hunter's aiming eye is high with respect to its exact aiming position.

It will therefore be understood that we have provided an improved binocular front sight for shot guns which will greatly improve the binocular shooting method and make it more accurate due to the fact that the aiming eye E (FIG. 1a) of the shooter is instantly attracted and moved to accurate target sighting position D at the breech end of the gun whilst the non-aiming eye F will not be attracted to the gun sight and will make no conscious effort to affect or control the aiming of the gun other than to aid the aiming eye in locating and following the moving target.

Various other modifications of the invention described and illustrated herein will most likely occur to those skilled in the art to which the invention relates and may be made without departing from the spirit thereof, the scope of which is indicated in the appended claims.

What is claimed is:

1. A binocular front bead sight for the barrels of firearms comprising a body positioned on the front end of the barrel and having a magnifying lens for changing the direction of light rays mounted thereon, a distinctive, minute object disposed in the principal focus of the magnifying lens, the principal axis of the magnifying lens lying substantially in a plane that contains the center line of the barrel, and said magnifying lens receiving light rays from said object and directing them as substantially parallel rays to a laterally restricted sighting position at the breech end of the barrel.

2. A binocular front sight for the barrels of firearms as set forth in claim 1 wherein the object is a spot of color.

3. A binocular front sight for the barrels of firearms as set forth in claim 1 wherein the magnifying lens is convex with respect to the breech end of the barrel.

4. A binocular front sight for the barrels of firearms as set forth in claim 3 wherein the said body is cylindrical and has its axis coincident with the principal axis of the lens.

5. A binocular front sight for the barrels of firearms as set forth in claim 4 including a translucent cover plate overlying the spot and affixed to the front end portion of said body, and wherein the object is illuminated by light rays passing through said cover plate.

6. A binocular front sight for the barrels of firearms as set forth in claim 5 wherein the cover plate has light reflecting particles imbedded therein.

7. A binocular front sight for the barrels of firearms as set forth in claim 5 wherein the cover plate has light refracting particles imbedded therein.

8. A binocular front sight for the barrels of firearms as set forth in claim 4 including a transparent element mounted on the front end of said body and having an inclined, reflective surface directing light rays substantially normal to said forward end of the body for illuminating said object.

9. A binocular front sight for the barrels of firearms as set forth in claim 4 including a second convex lens positioned across the front end of said body having its principal focus coinciding with the principal focus of the convex lens mounted across the breech end of said body, and wherein the object is illuminated by light rays passing through said convex lens.

10. A binocular front sight for the barrels of firearms as set forth in claim 4 wherein the object is located on said body, and including a transparent element mounted on the body forwardly of the convex lens, said element having an inclined reflective surface located above the spot.

11. A binocular front sight for the barrels of firearms as set forth in claim 4 wherein the object is a lamp bulb.

References Cited

UNITED STATES PATENTS

| | | | |
|---|---|---|---|
| 1,256,987 | 2/1918 | Dittemore | 33—47 |
| 2,706,335 | 4/1955 | Munsey | 33—47 |
| 2,807,981 | 10/1957 | Barnes | 88—1 X |
| 2,815,574 | 12/1957 | DuVarry | 33—47 |
| 3,098,303 | 6/1963 | Plish | 33—52 |
| 3,184,851 | 5/1965 | Simmons | 33—47 |

FOREIGN PATENTS 629,606   12/1961   Italy.

LEONARD FORMAN, *Primary Examiner.*

JOEL M. FREED, *Assistant Examiner.*